US011545280B2

(12) United States Patent
Raymond et al.

(10) Patent No.: US 11,545,280 B2
(45) Date of Patent: Jan. 3, 2023

(54) CABLE HOSE WITH EMBEDDED FEATURES

(71) Applicant: The ESAB Group Inc., Florence, SC (US)

(72) Inventors: Andrew Raymond, Lebanon, NH (US); Michael Nadler, Wilmot, NH (US); Ryan Lynaugh, Cornish, NH (US)

(73) Assignee: THE ESAB GROUP INC., Florence, SC (US)

( * ) Notice: Subject to any disclaimer, the term of this patent is extended or adjusted under 35 U.S.C. 154(b) by 187 days.

(21) Appl. No.: 16/110,180

(22) Filed: Aug. 23, 2018

(65) Prior Publication Data
US 2020/0066422 A1 Feb. 27, 2020

(51) Int. Cl.
H01B 7/02 (2006.01)
B23K 9/32 (2006.01)
(Continued)

(52) U.S. Cl.
CPC ............... *H01B 7/02* (2013.01); *B23K 9/323* (2013.01); *H01B 9/00* (2013.01); *H01B 13/06* (2013.01)

(58) Field of Classification Search
CPC .......... H01B 9/06; H01B 13/14; H01B 13/30; H01B 7/18; H01B 7/26; H01B 11/00;
(Continued)

(56) References Cited
U.S. PATENT DOCUMENTS 2,704,556 A 3/1955 Blish
2,939,903 A * 6/1960 Lapsley ............. H01B 11/1873
174/28
(Continued)

FOREIGN PATENT DOCUMENTS

CN 103137246 A 6/2013
CN 204423935 U 6/2015
(Continued)

OTHER PUBLICATIONS

Extended European Search Report for EP Patent Application No. 19190618.9 dated Jan. 7, 2020, 9 pages.
(Continued)

*Primary Examiner* — Justin C Dodson
*Assistant Examiner* — Dilnessa B Belay
(74) *Attorney, Agent, or Firm* — Edell, Shapiro & Finnan, LLC

(57) ABSTRACT

A cable hose suitable for welding or cutting systems includes one or more conductors and monolithic tubing that extends around and between the one or more conductors. The monolithic tubing defines one or more discrete passageways for the one or more conductors that provide a closed path from a first end of the cable hose to a second end of the cable hose for the one or more conductors. The monolithic tubing also defines an inner conduit configured to allow a gas to flow from the first end of the cable hose to the second end of the cable hose. The cable hose may be formed by arranging the one or more conductors in a specific configuration and overmolding an insulator onto the one or more conductors to secure the one or more conductors in a specific configuration.

18 Claims, 8 Drawing Sheets

(51) Int. Cl.
*H01B 9/00* (2006.01)
*H01B 13/06* (2006.01)

(58) Field of Classification Search
CPC .. H01B 11/1873; H01B 11/20; H01B 13/067; H01B 17/26; H01B 3/16; H01B 7/0233; H01B 7/30; H01B 9/003; H01B 9/0605
USPC ...... 219/137.9, 136; 174/15.7, 19, 15.6, 47, 174/89
See application file for complete search history.

(56) References Cited

U.S. PATENT DOCUMENTS

| | | | |
|---|---|---|---|
| 3,923,448 A | 12/1975 | Guth | |
| 4,234,779 A | 11/1980 | Willems | |
| 4,835,853 A | 6/1989 | Hirschberg | |
| 4,839,492 A | 6/1989 | Bouchier et al. | |
| 5,132,513 A | 7/1992 | Ingwersen et al. | |
| 5,491,321 A | 2/1996 | Stuart et al. | |
| 5,777,273 A | 7/1998 | Woody et al. | |
| 6,215,090 B1 | 4/2001 | Severance, Jr. et al. | |
| 6,239,373 B1 | 5/2001 | Sato et al. | |
| 6,337,443 B1 | 1/2002 | Dlugas et al. | |
| 7,081,586 B2 | 7/2006 | Rehrig | |
| 7,274,001 B1 * | 9/2007 | Cusick, III | B23K 9/323 219/137.9 |
| 7,750,240 B2 | 7/2010 | Jiang et al. | |
| 8,269,134 B2 | 9/2012 | Lin et al. | |
| 8,530,780 B2 | 9/2013 | Lin et al. | |
| 8,726,499 B2 | 5/2014 | McGiboney et al. | |
| 8,907,249 B2 | 12/2014 | Berger et al. | |
| 8,952,294 B2 * | 2/2015 | Serio | B23K 9/173 219/137.31 |
| 9,102,001 B2 | 8/2015 | Basit | |
| 9,288,888 B2 | 3/2016 | Griffin et al. | |
| 9,449,739 B2 | 9/2016 | Gao et al. | |
| 9,717,168 B2 | 7/2017 | Inoue et al. | |
| 9,862,056 B2 | 1/2018 | Berger et al. | |
| 2005/0139377 A1 * | 6/2005 | Levy | H01B 3/445 174/11 OR |
| 2007/0251716 A1 * | 11/2007 | Veggetti | H01B 7/184 174/113 R |
| 2014/0350650 A1 | 11/2014 | Raines | |
| 2014/0352386 A1 * | 12/2014 | Mettee, II | B29C 48/11 72/260 |
| 2015/0024297 A1 * | 1/2015 | Finnerty | B01F 25/31232 429/423 |
| 2015/0066080 A1 * | 3/2015 | Olson | D01D 5/247 606/228 |
| 2015/0083458 A1 | 3/2015 | Tanaka et al. | |
| 2015/0374978 A1 | 12/2015 | Howard et al. | |
| 2017/0276267 A1 | 9/2017 | Green et al. | |

FOREIGN PATENT DOCUMENTS

| | | |
|---|---|---|
| CN | 107993769 A | 5/2018 |
| DE | 102007014605 A1 | 9/2008 |
| EP | 0709610 A1 | 1/1996 |
| FR | 2710923 A1 | 4/1995 |
| GB | 2217425 A | 10/1989 |
| GB | 2500669 B | 3/2016 |
| KR | 20100108726 A | 10/2010 |

OTHER PUBLICATIONS

Communication Pursuant to Article 94(3) EPC for European Patent Application No. 19190618.9 dated Oct. 29, 2020, 7 pages.
Office Action issued by the China State Intellectual Property Office for Chinese Application No. 201910781049.8 with English translation, dated Sep. 27, 2020, 18 pages.
Office Action by the China National Intellectual Property Administration for Chinese Application for Invention No. 201910781049.8 dated May 19, 2021 with English translation, 17 pages.
Communication pursuant to Article 94(3) EPC for European Patent Application No. 19190618.9-1201 dated Jun. 4, 2021, 8 pages.
Communication pursuant to Article 94(3) EPC for European Patent Application No. 19190618.9-1201 dated Aug. 9, 2022, 8 pages.

* cited by examiner

CABLE HOSE WITH EMBEDDED FEATURES

TECHNICAL FIELD

The present disclosure is directed toward cable hoses and, in particular, to cable hoses with electrical and/or optical conductors.

BACKGROUND

Welding and cutting systems, such as plasma cutting systems, typically include multiple interconnected components. For example, a plasma cutting system may include a gas supply, a torch assembly, and a clamp that are each connected to a power source that interconnects these components. At least some of these components are connected to the power source by cable hoses (also referred to as leads, welding cables, etc.) that can guide welding or cutting resources, including gas and electricity, to their intended destination. That is, cable hoses are capable of transferring gas and electricity. To effectuate this, cable hoses typically include a first conduit or passageway for gas and a second conduit or passageway for conductors.

FIG. 1 illustrates one example prior art cable hose 100. The cable hose 100 includes an annular inner tube 102 with an inner surface 103 and an outer surface 104 and an annular outer tube 106 with an inner surface 107 and an outer surface 108. The inner surface 103 of the inner tube 102 defines a gas passageway 120 and the outer surface 104 of the inner tube 102 cooperates with the inner surface 107 of the outer tube 106 to define an annular compartment 110. Any conductors 140 (e.g., wires) included in the cable hose 100 are packed between the inner tube 102 and outer tube 106, in the annular compartment 110. Filler materials 130 are then packed around (and sometimes between) the conductors 140 to try to keep the conductors 140 in place. Unfortunately, this filler material does not extend completely between the various conductors 140 packed into the common space provided by the annular compartment 110. Consequently, each conductor 140 has its own insulator 142. Moreover, over time, the filler material 130 can compress or shift, which may allow the conductors 140 to move and/or allow the cross-sectional shape of the cable 100 to deform. In view of the foregoing, smaller, simpler, and structurally sound cable hoses are desired.

SUMMARY

The present disclosure is directed towards cable hoses for welding or cutting systems and methods of forming the same. According to one embodiment, a cable hose suitable for welding or cutting systems includes one or more conductors and monolithic tubing that extends around and between the one or more conductors. The monolithic tubing defines one or more discrete passageways for the one or more conductors and the one or more discrete passageways provide a closed path from a first end of the cable hose to a second end of the cable hose for the one or more conductors. The monolithic tubing also defines an inner conduit configured to allow a gas to flow from the first end of the cable hose to the second end of the cable hose. Thus, as compared to current solutions, such as the prior art shown in FIG. 1, the cable hose presented herein may reduce the diameter of the lead (because two tubes and filler material are not required) and reduce the amount of materials included in the lead (again, because two tubes and filler material are not required). Moreover, at least because the conductors are secured in discrete passageways, the conductors need not be individually insulated. Thus, as compared to current solutions, such as the prior art shown in FIG. 1, the cable hose presented herein may eliminate time and costs associated with coating each conductor.

In at least some of these embodiments, the one or more conductors are a plurality of conductors and the monolithic tubing is formed around and between the plurality of conductors by molding an insulator over the plurality of conductors. This may simplify formation of the cable hose and, thus, further decrease manufacturing costs. Additionally or alternatively, the one or more conductors may be electrical conductors and the closed path is an insulated path that prevents electrical current introduced into the cable hose at the first end or the second end from exiting the cable hose radially. As mentioned, the one or more electrical conductors may even be uninsulated electrical conductors. Still further, the one or more conductors may be optical conductors and the closed path may prevent optical signals introduced into the cable hose at the first end or the second end from exiting the cable hose radially. Due to at least the aforementioned features, the cable hose presented herein may be customizable to meet various specifications. For example, any specific conductor can be easily selected, the overmolding may allow the size of the inner conduit to be easily increased or decreased without impacting the outer diameter of the cable hose, the thickness of the cable hose can be easily enlarged or shrunk to accommodate more or less conductors and/or to increase or decrease an amount of insulation between conductors, etc.

In at least some embodiments, the one or more conductors include a first set of conductors and a second set of conductors. In at least one instance, the first set of conductors may be arranged around a first circumference and the second set of conductors may be arranged around a second circumference, the first and second circumferences each being disposed within the monolithic tubing. Additionally or alternatively, the first set of conductors and the second set of conductors may both patterned around a single circumference within the monolithic tubing. Embedding different sets of conductors into the cable hose may allow a single cable hose to handle various functions, such as passing current, electrically-based signals, and/or optical-based signals while also transporting gas, liquid, wire (e.g., welding wire) and/or other such welding or cutting resources through the inner conduit.

In at least some embodiments, the one or more conductors are fixed in place within the one or more discrete passageways from the first end to the second end of the cable hose. Additionally or alternatively, an inner wall of the monolithic tubing may define the inner conduit, an outer wall of the monolithic tubing may define an outer surface of the cable hose, and the one or more conductors may be disposed between the inner wall and the outer wall. Consequently, the conductors are protected from gasses passing through the inner conduit as well as dirt and debris disposed exteriorly of the cable hose. These features may also provide rigidity to the tubing to prevent the cable hose from collapsing and to reinforce the tubing against burst pressure. Moreover, the tubing is configured to withstand the pressure of one or more working gases or fluids passing through the inner conduit and, thus, can protect the conductors while the conductors pass current and/or signals.

In some of these embodiments, the one or more discrete passageways are helical passageways that braid the one or more conductors around the inner conduit. This may create a protective netting around the inner conduit that increases the structural stability of the cable hose and/or the inner conduit. Braiding the conductors around the inner conduit may also improve the resiliency of the cable hose.

Still further, in some embodiments, an inner wall of the monolithic tubing defines the inner conduit, and the inner wall includes one or more ridges that introduce turbulence into the flow of the gas in the inner conduit. Additionally or alternatively, the cable hose may include an internal component that is disposed within the inner conduit and introduces turbulence into the flow of the gas in the inner conduit and/or divides the inner conduit into two or more subconduits. In at least some of these embodiments, the monolithic tubing defines the internal component. Introducing turbulence (with the ridges, the internal element, or both) may reduce or eliminate boundary layers, which, in turn, may reduce or eliminate pressure losses and/or decrease the temperatures of any conductors embedded within the tubing.

In at least some embodiments, the cable hose is configured to connect a power source for a welding or cutting system to a torch assembly for the welding or cutting system so that the power source can supply gas and electrical current to the torch assembly. In some of these embodiments, the one or more conductors are uninsulated electrical conductors and the closed path is an insulated path that prevents electrical current from exiting the cable hose radially.

According to one embodiment, a method of forming a cable hose includes arranging one or more conductors in a specific configuration and overmolding an insulator onto the one or more conductors. The overmolding forms a monolithic tubing that extends around and between the one or more conductors to secure the one or more conductors in the specific configuration and to define an inner conduit configured to allow a gas to flow from a first end of the cable hose to a second end of the cable hose. The monolithic tubing provides a closed path from the first end to the second end for the specific configuration of the one or more conductors. In at least some of these embodiments, the one or more conductors are uninsulated electrical conductors and the closed path is an insulated path that prevents electrical current from exiting the cable hose radially.

BRIEF DESCRIPTION OF THE SEVERAL VIEWS OF THE DRAWINGS

Like numerals identify like components throughout the figures.

DETAILED DESCRIPTION

An improved cable hose and method for forming the same are presented herein. The cable hose is a unitary or monolithic (i.e., one-piece) cable hose that is formed by embedding electrical and/or optical conductors (e.g., wires and/or fiber optics) within unitary or monolithic tubing. That is, the cable hose presented herein embeds conductors, such as optical or electrical conductors, in monolithic tubing, which may be formed from any desirable insulator material. Additionally or alternatively, the cable hose may be formed with internal components, such as air-flow components formed within an inner/internal conduit. For example, the cable hose presented herein may include electrical conductors embedded in an insulator material and air-flow components disposed in an inner conduit (e.g., a central, gas-flow passageway) that is radially interiorly of the electrical conductors (and the insulator material). In at least some embodiments, the tubing (e.g., an insulator) may be overmolded onto the conductors and also molded to form an internal component.

Figure 1:
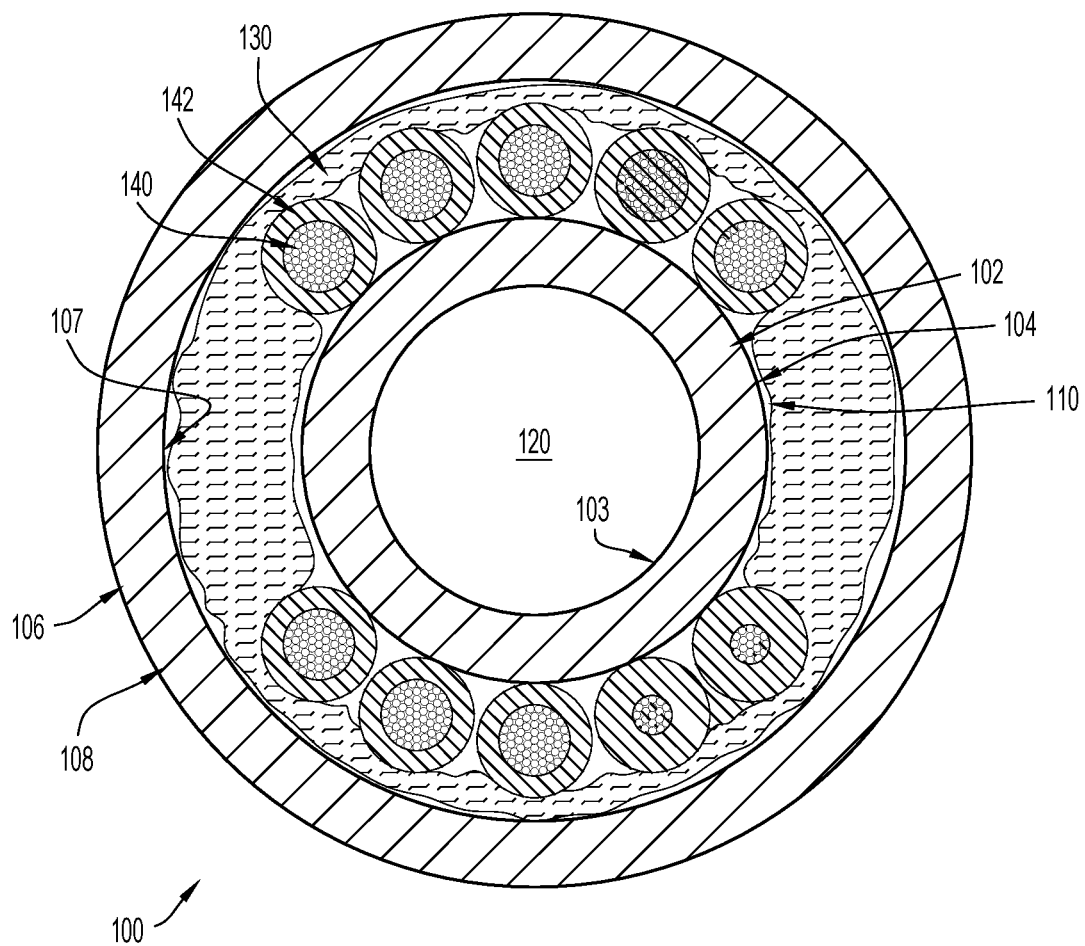
FIG. 1 is a front sectional view of a prior art cable hose.

Advantageously, since the cable hose is formed from monolithic tubing, the cable hose may reduce the diameter of the cable hose and reduce the amount of materials included in the cable hose as compared to typical cable hoses, such as the prior art shown in FIG. 1, which house insulated (e.g., coated) conductors in a compartment that is formed between two separate and discrete tubes and filled with filler material. Moreover, since the conductors are embedded in monolithic tubing, the conductors are: (1) held in place; and (2) insulated from each other and a user. Thus, the conductors need not include individualized insulation; the conductors can be uninsulated and time and costs associated with coating each conductor with an insulator can be eliminated. Still further, the cable hose presented herein may be easy to customize to meet various specifications at least because the cable hose is formed with a minimal number of steps and does not require multiple tubes and filler material to be sequentially assembled.

Figure 2:
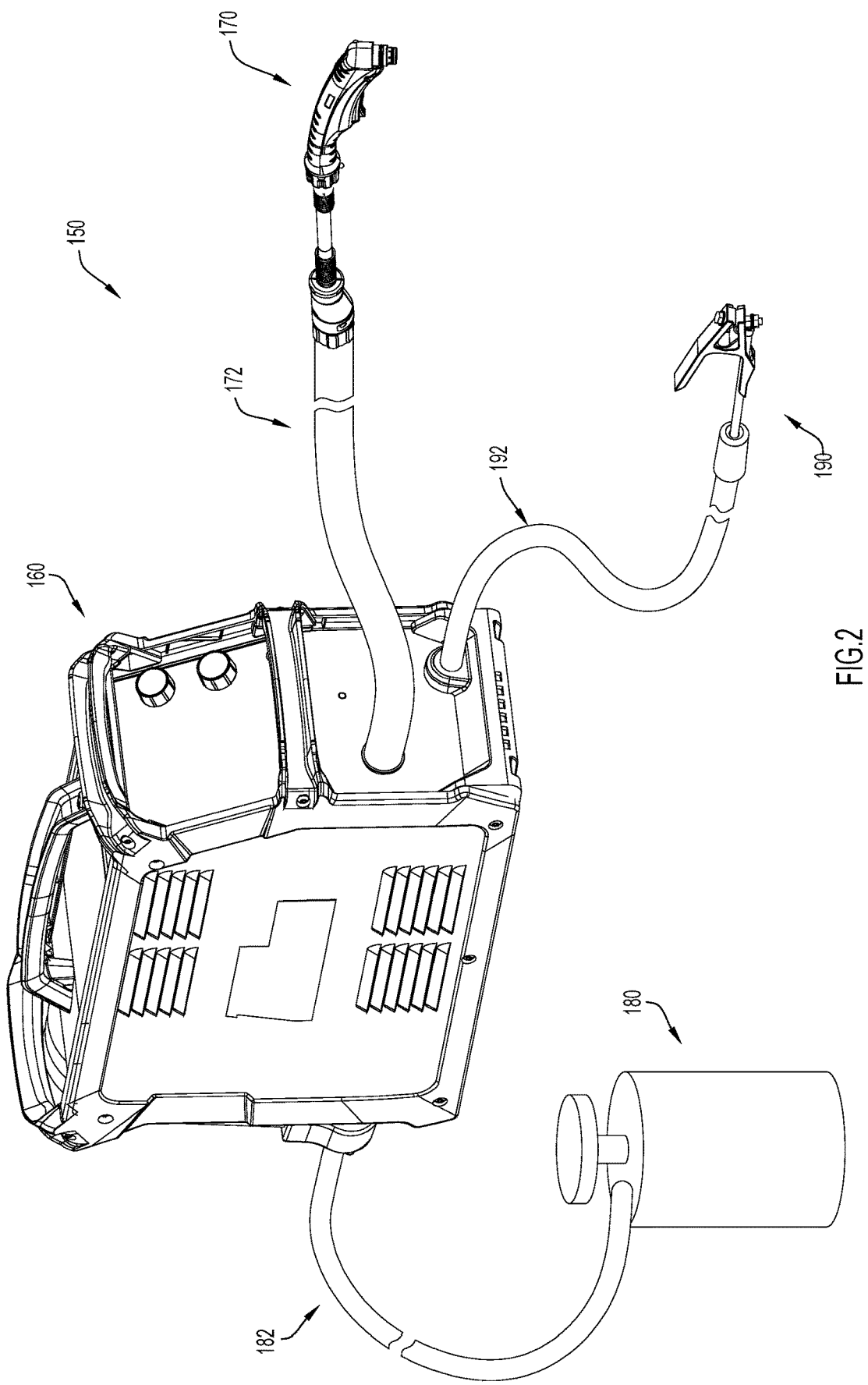
FIG. 2 is a perspective view of a cutting system including a gas supply, a power source, and a torch assembly, at least two of which are connected via cable hoses formed in accordance with an example embodiment of the present disclosure.

FIG. 2 illustrates an example embodiment of cutting system 150 that may utilize the cable hose presented herein. At a high-level, the depicted cutting system 150 includes a power source 160 that supplies power to a torch assembly 170. The power source 160 also controls the flow of gas from a gas supply 180 to the torch assembly 170 (however, in other embodiments, the power source 160 might supply the gas itself). The gas supply 180 is connected to the power source via cable hose 182 and the power source 160 is connected to the torch assembly 170 via cable hose 172. The cutting system 150 also includes a working lead 192 with a grounding clamp 190. Although these cable hoses are illustrated as being relatively short, cable hose 172, cable hose 182, and/or cable hose 192 may each be any length. In order to connect the aforementioned components, the opposing ends of cable hose 172, cable hose 182, and/or cable hose 192 may each be coupled to the power source 160, torch assembly 170, gas supply 180, or clamp 190 in any manner now known or developed hereafter (e.g., a releasable connection). Moreover, although not shown, the cable hoses presented herein might also be used in welding systems, automated cutting systems, and/or any other system in which welding or cutting resources might need to flow between two components.

FIGS. 3A, 3B, 4A, 4B, 5A, 5B, 6A, 6B, 7A-C, 8A-C, 9A, and 9B depict various embodiments of a cable hose with embedded elements. Each of these embodiments can be used as cable hose 172 (e.g., to transfer signals, current, gas, etc. between a power source and a torch assembly), cable hose 182 (e.g., to transfer signals and gas between a power source and a gas supply), and/or cable hose 192 (e.g., to transfer signals and current between a power source and a clamp). However, these embodiments are not intended to be limiting. Instead, any feature of any embodiment shown in these Figures may be combined with or incorporated into any other embodiment or combined with any feature of any embodiment (e.g., to create an unillustrated embodiment).

Generally, each of the cable hoses 200 depicted in FIGS. 3A, 3B, 4A, 4B, 5A, 5B, 6A, 6B, 7A-C, 8A-C, 9A, and 9B extends from a first end 202 (e.g., an end that can connect to a power source) to a second end 204 (e.g., an end that can connect to a torch assembly). The length "L" between the first end 202 and the second end 204 can be any desirable length, such as a length in the range of approximately three (3) feet to approximately one hundred fifty (150) feet. Moreover, each of the cable hoses 200 is formed from a unitary or monolithic tubing 210 that is annular and extends from an inner surface or wall 212 to an outer surface or wall 216. The inner wall 212 defines an inner conduit 212 that may be suitable to guide gas (e.g., shielding gas, process gas, etc.), fluid (e.g., coolant, water, etc.), and/or wire (e.g., welding wire) from the first end 202 to the second end 204. In the depicted embodiments, the inner wall 212 and outer wall 216 have concentric and symmetrical or regular geometries; however, in other embodiments, the inner wall 212 and/or outer wall 216 need not be symmetrical and, instead, may be irregular, eccentric, and/or have any desirable configuration. For example, the outer wall 216 might be elliptical and the inner wall 212 might be a circular wall disposed adjacent to one end of the elliptical outer wall 216.

In at least some embodiments, the tubing 210 is an electrical insulator, such as chlorinated polyethylene (PE), neoprene, polyvinyl chloride, silicone, polyolefin, ethylene propylene diene monomer (EPDM), acrylonitrile butadiene styrene (ABS) blends, or a combination thereof that is suitable of preventing current from leaking radially from the cable hose and/or for preventing electrical or optical signals from exiting the cable hose 200 radially. The material forming the tubing 210 can also withstand the pressure of one or more working gases or fluids (or objects, such as welding wire) passing through an inner conduit 220 formed within the cable hose 200 and, thus, can protect (e.g., insulate) any electrical and or optical conductors 250 embedded within the tubing 210.

As is discussed in further detail below, in at least some embodiments, the tubing 210 is formed by overmolding a material, such as an electrical insulator, over one or more conductors 250. Consequently, the tubing 210 extends around and between the conductors 250, securing each of the conductors 250 in a discrete position over the length L of the cable hose 200. That is, the tubing 210 creates a closed path from the first end 202 of the cable hose 200 to the second end 204 of the cable hose 200 for each conductor 250 so that the conductors 250 are not accessible from a location that is radially exterior of the cable hose 200. Instead, the conductors 250 are accessible from only the first end 202 or the second end 204. This prevents signals or current from exiting the cable hose 200 radially and, instead, causes the current and signals (in addition to gas, fluid, etc. traveling in the inner conduit 220), to traverse the cable hose 200 end-to-end (e.g., from the first end 202 to the second end 204). Moreover, since the tubing 210 defines discrete passageways that secure each of conductors 250 in a particular location or configuration along the length L of the cable hose 200 (from the first end 202 to the second end 204), the cable hose 200 does not and need not include filler material that might create bending or stability problems as it deforms or bunches over time.

Still referring generally to FIGS. 3A, 3B, 4A, 4B, 5A, 5B, 6A, 6B, 7A-C, 8A-C, 9A, and 9B, the conductors 250 may include electrical conductors that can pass current and signals and/or optical conductors that can pass optical images and/or signals. For example, the conductors 250 may be aluminum, copper-clad aluminum, or copper electrical conductors and/or fiber optic optical conductors. Notably, since the conductors 250 are each secured in a discrete pathway formed within the tubing 210, the conductors 250 need not include individualized insulation. That is, the conductors 250 need not be coated. Nevertheless, conductors 250 may still include this insulation if desired. For example, if conductors 250 to be included in the cable hose 200 were already coated with insulation and additional steps would be required to remove the insulation, the insulated conductors could simply be embedded in the tubing 210 with their individualized insulation (instead of taking the time to remove the insulation). An example of a cable hose with individually insulated wires is described below in connection with FIGS. 5A and 5B. Regardless of the specific type of conductor 250 included in the cable hose 200, the electrical and/or optical conductors 250 can provide rigidity to the tubing 210 to prevent the cable hose 200 from collapsing and reinforce the tubing 210 against burst pressure.

Figure 3A:
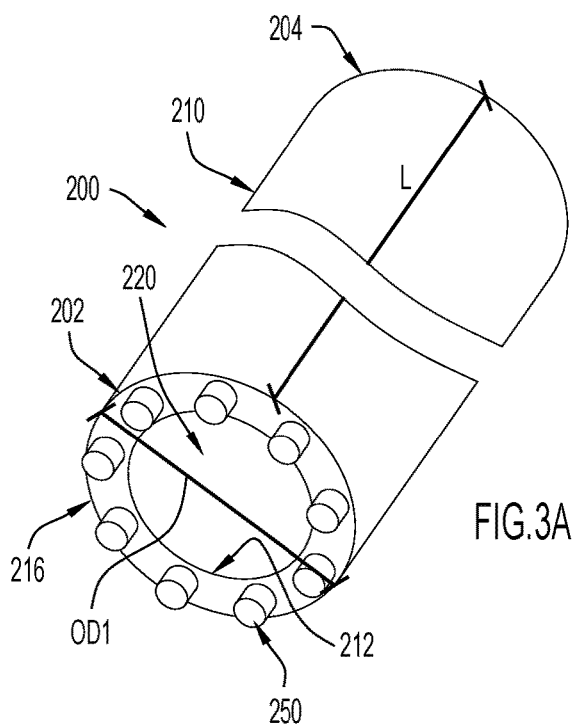
FIGS. 3A and 3B are perspective and front sectional views of a first embodiment of a cable hose formed in accordance with an example embodiment of the present disclosure.
Figure 3B:
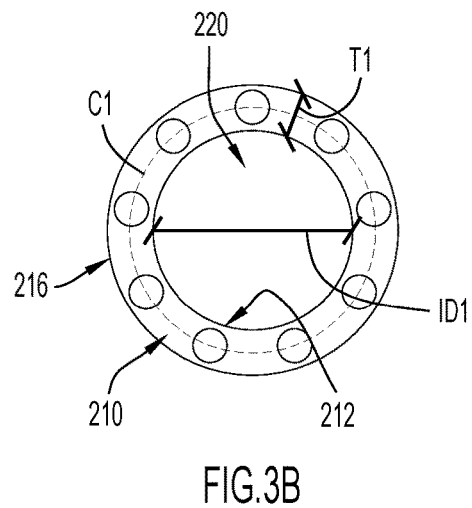

In FIGS. 3A and 3B, the cable hose 200 includes nine embedded conductors 250 that are equally spaced around a central portion of the tubing 210. More specifically, the conductors 250 are equally spaced around a circumference "C1" that substantially bisects a thickness "T1" of the tubing 210. However, in other embodiments, the conductors need not be equally spaced and the circumference C1 need not bisect the thickness T1 of the tubing 210. In the depicted embodiment, the thickness T1 is defined by the difference between an outer diameter "OD1" and an inner diameter "ID1" and, in various embodiments, may be adjusted by changing the inner diameter ID1, the outer diameter OD1, or both, to customize the cable hose 200 for any specifications. For example, in some instances, it may be desirable to expand the thickness T1 so that the tubing 210 can accommodate more conductors 250 and/or provide more insulation between conductors 250 without impacting the size of the inner conduit 220. In these instances, the outer diameter can be increased (above OD1) without changing the inner diameter from ID1. On the other hand, if the overall circumference of the cable hose 200 needs to remain as small as possible, the inner diameter can be decreased (below ID1) while the outer diameter remains constant (e.g., at OD1).

Figure 4A:
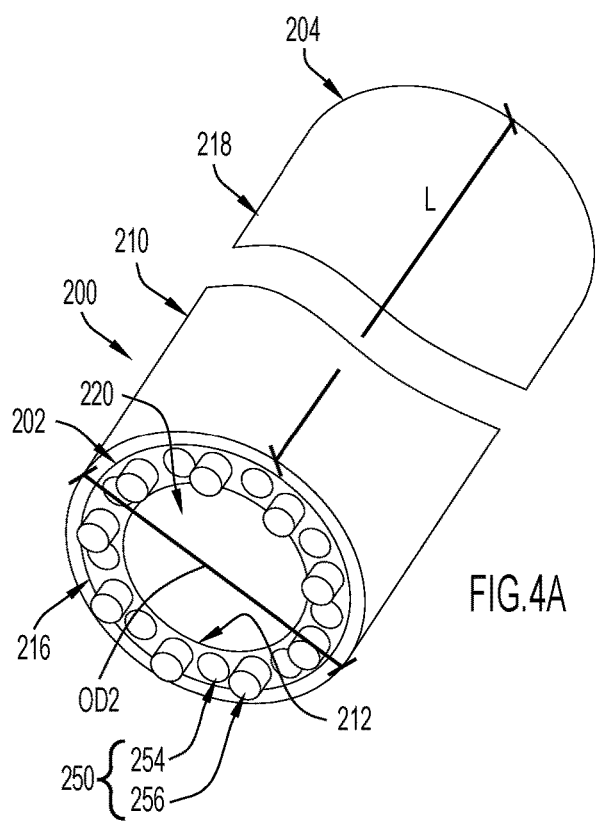
FIGS. 4A and 4B are perspective and front sectional views of a second embodiment of a cable hose formed in accordance with an example embodiment of the present disclosure.
Figure 4B:
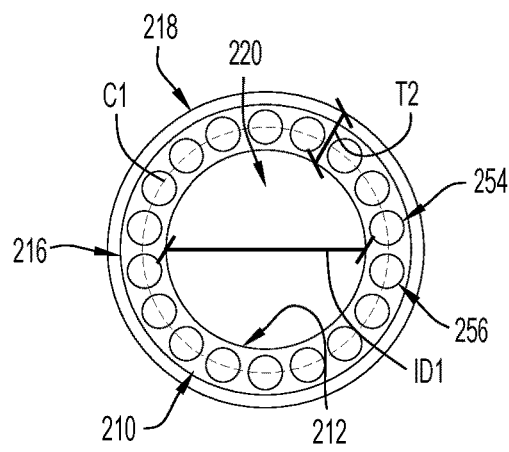

FIGS. 4A and 4B illustrate one manner in which a cable hose 200 may accommodate an increased number of conductors as compared to the embodiment illustrated in FIGS. 3A and 3B. In this embodiment, the dimensions of the cable hose are held constant as compared to the embodiment illustrated in FIGS. 3A and 3B (e.g., the thickness remains T1, the outer diameter remains OD1 and the inner diameter remains ID1); however, now, eighteen conductors are included around circumference C1. More specifically, the conductors 250 now include two different types of conductors: first conductors 254 (shown extending a first distance beyond the tubing 210 in the perspective sectional view of FIG. 4A) and second conductors 256 (shown extending a second distance, greater than the first distance, beyond the tubing 210 in the perspective sectional view of FIG. 4A). A set of the second conductors 256 are patterned between a set of the first conductors 254 so that the conductors are alternating around the circumference C1.

In some embodiments, the first set of conductors 254 might conduct electrical current to be used, for example, to ionize gas for a plasma cutting operation, and the second set of conductors 256 might be used to transfer signals along the cable hose 200 (e.g., between a torch assembly and a power source). Thus, the first set of conductors 254 might be electrical conductors and the second set of conductors 256 might be optical conductors or electrical conductors. If conductors 254 and 256 are both electrical conductors, conductors 254 might be a first type of electrical conductors (e.g., copper) and conductors 256 might be a second type of electrical conductors (e.g., aluminum). Alternatively, conductors 254 and 256 might be the same type of electrical conductors and may simply be dedicated to different operations (e.g., conducting signals and conducting current). Still further, in some embodiments, conductors 254 and 256 might be the same type of conductors and may cooperate to complete one or more tasks.

Since the cable hose 200 depicted in FIGS. 4A and 4B includes double the number of conductors 250 as compared to the cable hose 200 depicted in FIGS. 3A and 3B, less spacing is included between each of the conductors 250, with the exact decrease depending on the thickness of the conductors 250. For example, if the conductors all have the same thickness and are each aligned on the same circumference, the spacing between adjacent conductors may be equal to $$\frac{C}{N} - D,$$

where C is the circumference of a circle on which the conductors are aligned (e.g., C1), N is the number of conductors (e.g., nine or eighteen), and D is the diameter of each conductor. As a more specific example, the cable hose 200 depicted in FIGS. 3A and 3B might provide approximately 0.04 inches of space between edges of adjacent conductors 250 and the cable hose 200 depicted in FIGS. 4A and 4B might provide approximately 0.125 inches of space between edges of adjacent conductors 250, depending on dielectric strength of monolithic tubing 210.

Still referring to FIGS. 4A and 4B, although the tubing 210 typically defines an outer wall of the cable hose 200, in some embodiments, the tubing 210 may also include a cover 218, such as an electromagnetic shield, that defines an outer wall of the cable hose 200. In some embodiments, the cover 218 may be added to the cable hose 200 after the tubing 210 is overmolded onto the conductors 250. Alternatively, the cover 218 could be formed during the overmolding, embedded into the tubing 210 or otherwise included in the cable hose 200. However, notably, since the tubing 210 of the cable hose 200 presented herein extends in and around the conductors 250, the cable hose 200 need not include a cover 218 that is formed of the same material as tubing 210. That is, in comparison to typical cable hoses, such as the prior art shown in FIG. 1, the cable hose presented herein does not require an inner tube and an insulating outer tube/cover/jacket that are formed of the same material. Thus, the cable hose presented herein eliminates redundant materials associated with typical cable hoses, such as the prior art shown in FIG. 1.

Figure 5A:
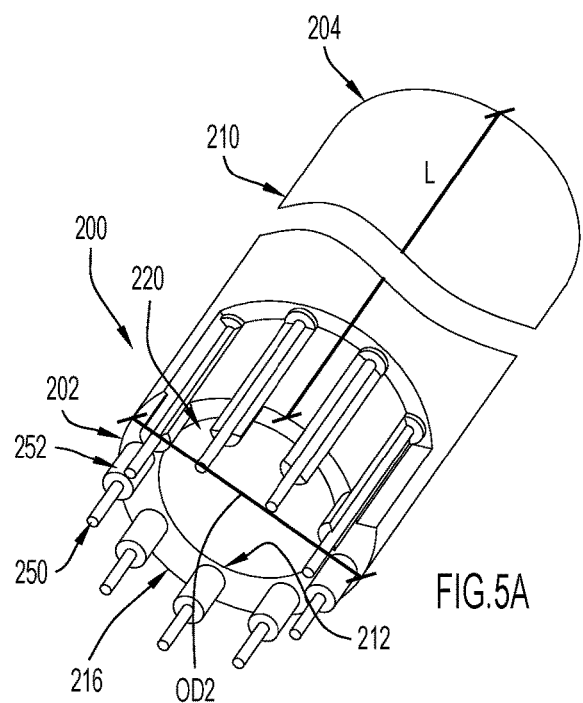
FIGS. 5A and 5B are perspective and front sectional views of a third embodiment of a cable hose formed in accordance with an example embodiment of the present disclosure.
Figure 5B:
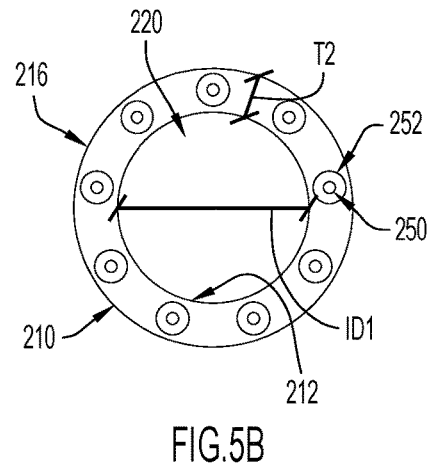

FIGS. 5A and 5B depict another embodiment of a cable hose 200 that is substantially similar to the embodiment depicted in FIGS. 3A and 3B; however, now, the conductors 250 include individualized insulation. That is, in the embodiment shown in FIGS. 5A and 5B, the conductors 250 include a coating 252. This coating 252 is not necessarily needed since the tubing 210 may provide insulation between the conductors 250; however, FIGS. 5A and 5B illustrate how a cable hose 200 formed in accordance with the techniques presented herein may still include conductors 250 with individualized insulation 252 (i.e., coated conductors) if desired. Consequently, the cable hose 200 can accommodate conductors 250 that are manufactured with coatings 252 without requiring that the coatings 252 be stripped from the conductors 250.

Notably, if the cable hose 200 includes coated conductors like the embodiment shown in FIGS. 5A and 5B and/or includes a cover 218 like the embodiment shown in FIGS. 4A and 4B, the thickness of the cable hose 200 may, in at least some embodiments, become, at least slightly, larger. Thus, in the embodiment depicted in FIGS. 4A, 4B, 5A and 5B, the cable hoses 200 have an outer diameter "OD2" that is larger than the outer diameter OD1 of the embodiments depicted in FIGS. 3A and 3B. However, the inner diameter ID1 is constant across all three of these embodiments, resulting in the cable hoses 200 of FIGS. 4A, 4B, 5A and 5B having a thickness "T2" that is larger than the thickness T1 of the embodiment depicted in FIGS. 3A and 3B.

Figure 6A:
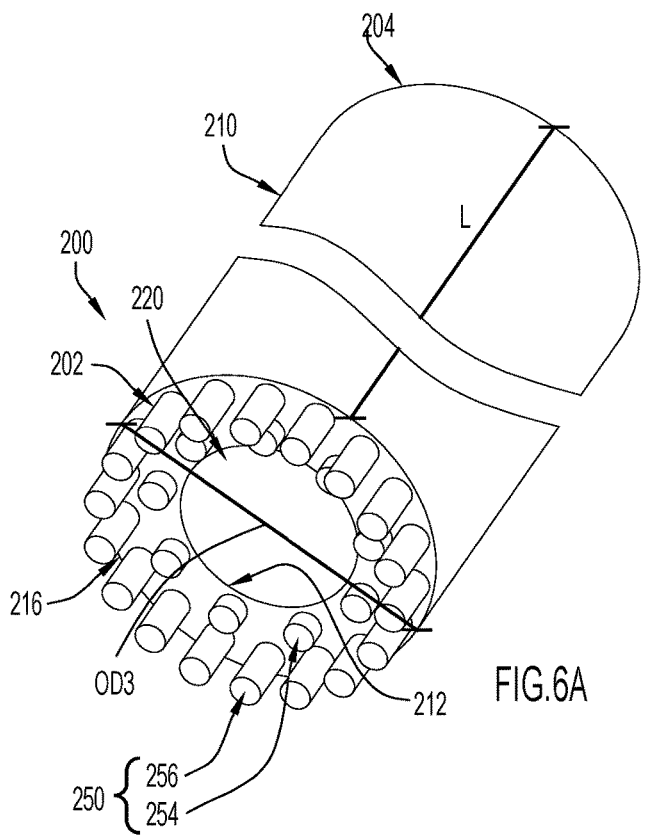
FIGS. 6A and 6B are perspective and front sectional views of a fourth embodiment of a cable hose formed in accordance with an example embodiment of the present disclosure.
Figure 6B:
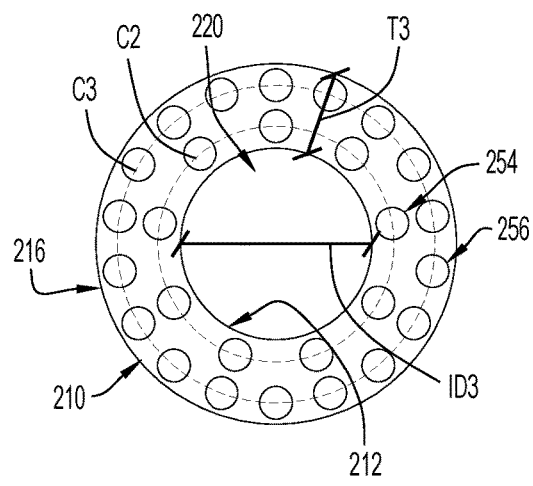

FIGS. 6A and 6B depict yet another embodiment of a cable hose including embedded elements. In this embodiment, the cable hose 200 has a thickness "T3" that is larger than both than the thickness T1 of the cable hose 200 depicted in FIGS. 3A and 3B and the thickness T2 of the cable hoses 200 depicted in FIGS. 4A, 4B, 5A, and 5B. Thickness T3 is created by forming the tubing 210 with an inner diameter "ID3" that is smaller than inner diameter ID1 and with an outer diameter "OD3" that is larger than both outer diameter OD1 and outer diameter OD2. This thickness allows the cable hose to accommodate two sets of conductors 250 along two different circumferences. In particular, the cable hose 200 includes a set of the first conductors 254 patterned along a first circumference C2 and includes a set of the second conductors 256 patterned along a second circumference C3. That is, the first conductors 254 are patterned around the inner conduit 220 in a first ring and the second conductors 256 are patterned around the inner conduit 220 (and the first conductors 254) in an outer ring that is concentric with the inner ring. In the depicted embodiment, the set of first conductors 254 includes nine conductors and the set of second conductors 256 includes eighteen conductors. However, in other embodiments, each set of conductors may include any number of conductors aligned in any alignment or configuration. As was discussed above in connection with FIGS. 4A and 4B, the first and second conductors 254, 256 may be different types of conductors, the same type of conductors dedicated to different operations, the same type of conductors dedicated to the same operation, or any other combination.

Figure 7A:
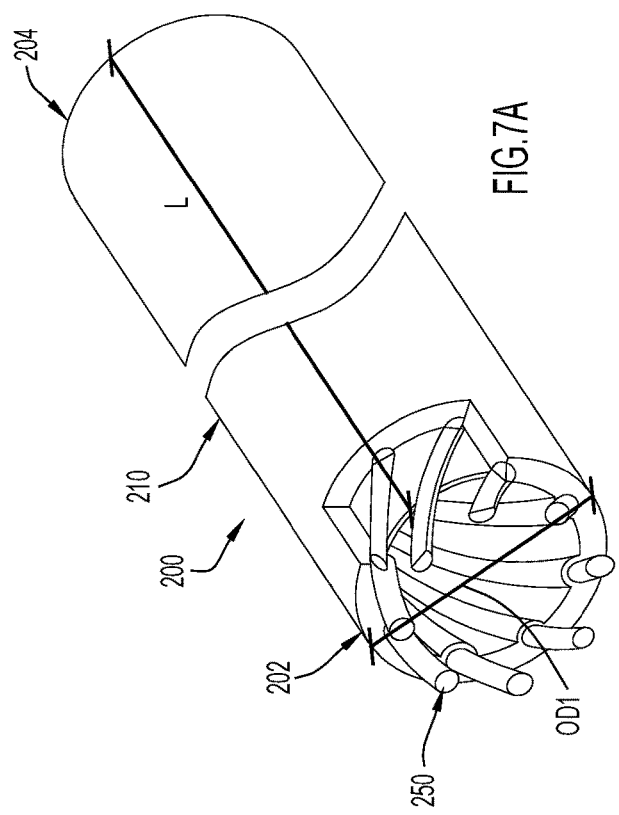
FIGS. 7A and 7B are two sectional perspective views of a fifth embodiment of a cable hose formed in accordance with an example embodiment of the present disclosure.
Figure 7C:
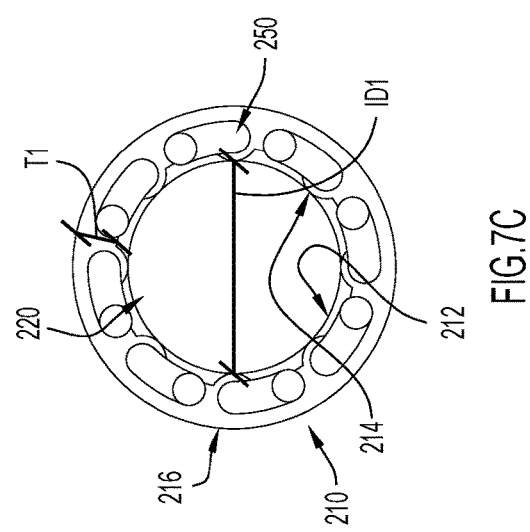
FIG. 7C is a front view of the fifth embodiment.
Figure 7B:
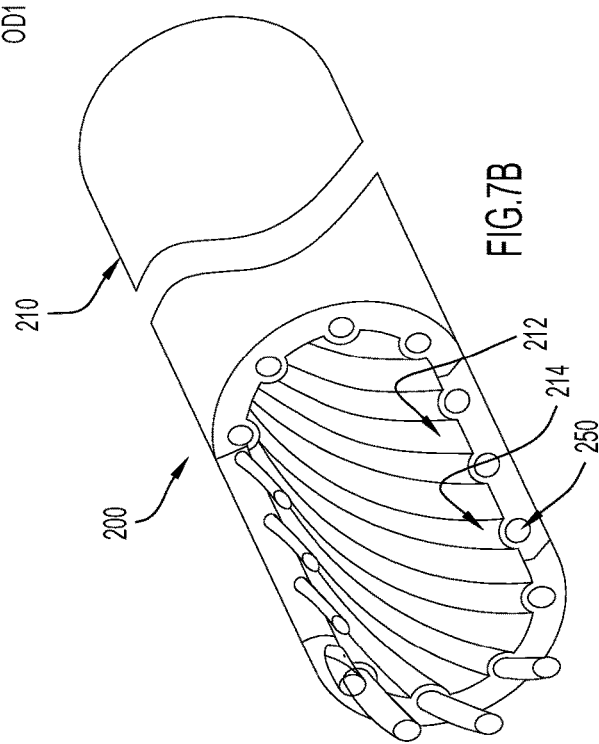

Now turning to FIGS. 7A-C, these figures depict an embodiment where the conductors 250 are braided or weaved around the internal passageway 220 in a helical manner. This braiding causes the conductors 250 to form a protective "netting" around the internal conduit 220 that may improve the pliability and resilience of the cable hose 200 as compared to other solutions (e.g., solutions with straight conductors 250) while also adding structural integrity as compared to other solutions (e.g., solutions with straight conductors 250). In fact, in at least some instances, the netting may ensure that the cable hose 200 can bend, crush or generally deform as needed and then return to its original geometry.

Moreover, in the embodiment illustrated in FIGS. 7A-C, the inner wall 212 of the tubing 210 (which defines the inner conduit 220) includes ridges 214 that are aligned with the conductors 250 so that the ridges 214 extend helically within the inner conduit 220. These ridges 214 encircle the inner conduit 220 while traversing the length L of the cable hose. The ridges 214 also protrude inward from the inner wall 210 and, thus, provide ridges 214 that extend longitudinally and radially through the inner conduit 220 to roughen the edges of inner conduit 220. In some embodiments, the ridges 214 are formed by molding portions of the inner tube 210 inward (e.g., inward of inner diameter ID1) along the portions of the inner tube where the conductors 250 are running. Alternatively, the ridges 214 may be created by removing material disposed between the conductors 250 to create grooves (extending outwards from inner diameter ID1) between the conductors 250 (e.g., grooves that define the ridges 214). Either way, the ridges 214 do not expose the conductors 250 to the inner conduit 220; there is still material from the tubing 210 between the conductors 250 and the inner conduit 220. Instead, the ridges 214 alter the geometry of the edges of the inner conduit 220.

Providing ridges 214 along the boundary of the inner conduit may introduce turbulence to a gas or liquid flowing through the inner conduit 220. In fact, in at least some embodiments, the ridges 214 may introduce and sustain near or fully turbulent gas flow throughout the length L of the cable hose 200. By maintaining a turbulent flow, boundary layers (and hence pressure losses) will decrease as the flow is mixed. This may also decrease the thermal boundary layer inside the cable hose 220, which, in turn, may decrease the temperatures of any conductors 250 embedded within the tubing 210 of the cable hose 200. Among other advantages, lower the temperatures of the conductors 250 may add a safety factor to the cable hose 200, for example, by adding a safety factor for a specific wire gauge utilized as conductor 250 for a given operating current. Additionally or alternatively, the ridges 214 may decrease an amount of friction between the tubing 210 and an object (e.g., a welding wire) passing through the conduit 220, which may also decrease the temperature of the tubing 210 and/or the conductors 250.

Figure 8A:
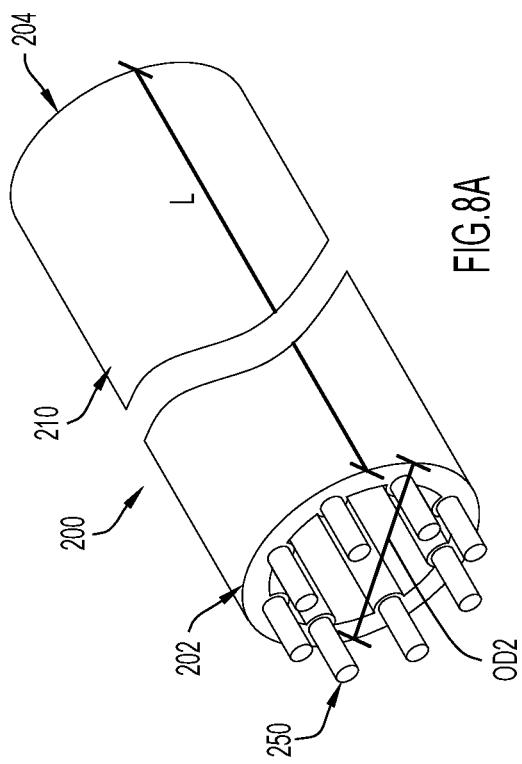
FIGS. 8A and 8B are two sectional perspective views of a sixth embodiment of a cable hose formed in accordance with an example embodiment of the present disclosure.
Figure 8C:
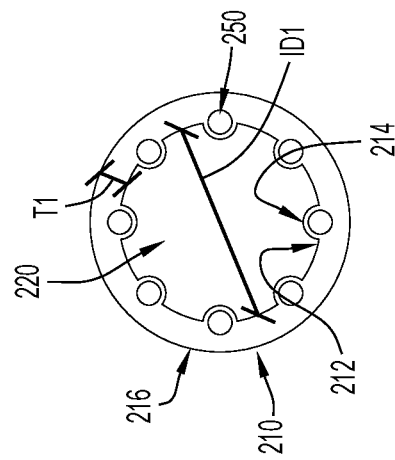
FIG. 8C is a front view of the sixth embodiment.
Figure 8B:
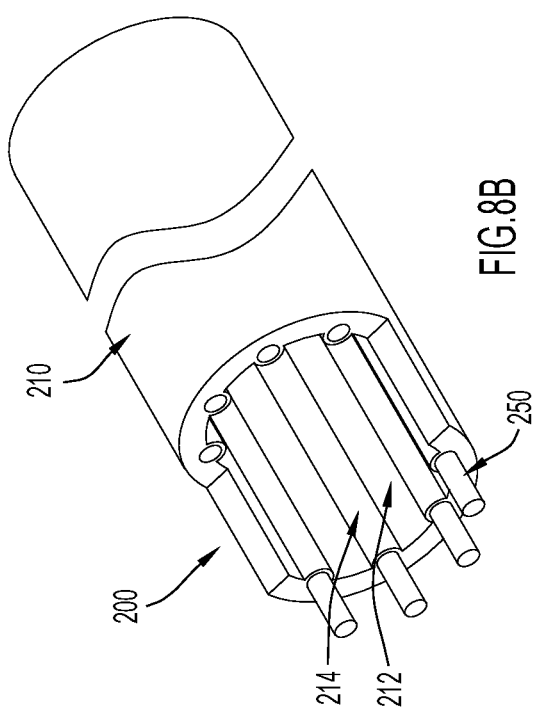

FIGS. 8A-8C depict another embodiment with ridges 214; however, in this embodiment, the ridges 214 extend longitudinally along the cable hose 220 without any curvature. That is, in the embodiment depicted in FIGS. 8A-C, the ridges 214 are substantially straight and parallel to the length L of the cable hose 220. Despite this difference, the ridges 214 may still introduce turbulence to a gas flowing through the inner conduit 220 to achieve, perhaps to a lesser extent, the advantages described above in connection with the embodiment depicted in FIGS. 7A-C.

Figure 9B:
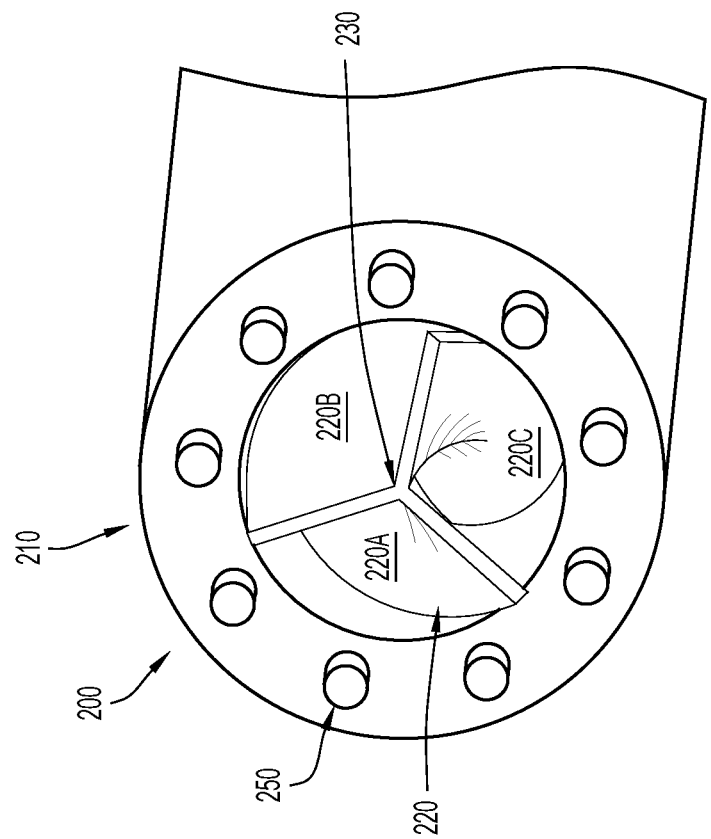
FIGS. 9A and 9B are two perspective sectional views of a seventh embodiment of a cable hose formed in accordance with an example embodiment of the present disclosure.
Figure 9A:
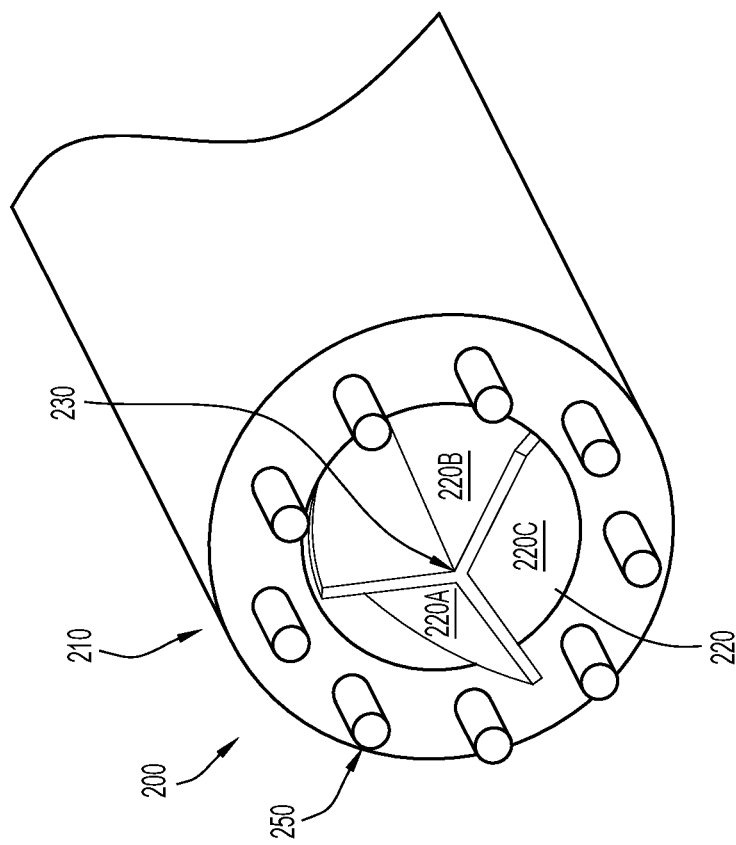

Now turning to FIGS. 9A and 9B, in addition to or as an alternative to the ridges 214, the cable hose 200 presented herein may include an internal element 230 that is formed within the inner conduit 220. The internal element 230 may, in at least some embodiments, be formed with the tubing 210 (e.g., formed while overmolding the tubing 210 onto the conductors 250). Alternatively, the internal element 230 may be formed separately from the tubing 210 and inserted into the tubing 210 subsequent to overmolding the tubing 210 onto the conductors 250. Moreover, in at least some embodiments, the internal element 230 may span the inner conduit and, thus, may be connected to the inner wall 212 at two or more connection points on approximately opposite sides of the inner conduit 220. Alternatively, the internal element 230 may be configured to float (or nearly float) within the inner conduit 220 (notably, if the internal element 230 is formed with the tubing 210, the internal element 230 will be connected to the tubing 210 in at least one location). In the embodiment depicted in FIGS. 9A and 9B, the internal component 230 is shaped as a helical- or corkscrew-shaped element and is formed during formation of the tubing 210 (e.g., the internal component 230 is integral to the tubing 210) and spans the cross-sectional area of the inner conduit 220.

Regardless of how the internal element 230 is formed or shaped, the internal element 230 may, like ridges 214, introduce turbulence to a gas flowing through the inner conduit 220 to achieve the advantages described above in connection with the embodiment depicted in FIGS. 7A-C (perhaps to a greater extent than ridges 214). Additionally or alternatively, the internal element 230 may segment the inner conduit into sub-conduits or channels, such as sub-conduits 220A, 220B, and 220C. These sub-conduits might allow the cable hose to provide passageways for gases used for different purposes, (e.g., plasma gas, shielding gas, post-flow gas, etc.) and/or for different gases, perhaps to allow fine-tuned control of gas mixing at a location upstream of gas supplies. Moreover, the internal element 230 can increase bending resistance of the cable hose 200, which may improve the structural integrity of the cable hose 200.

Figure 10:
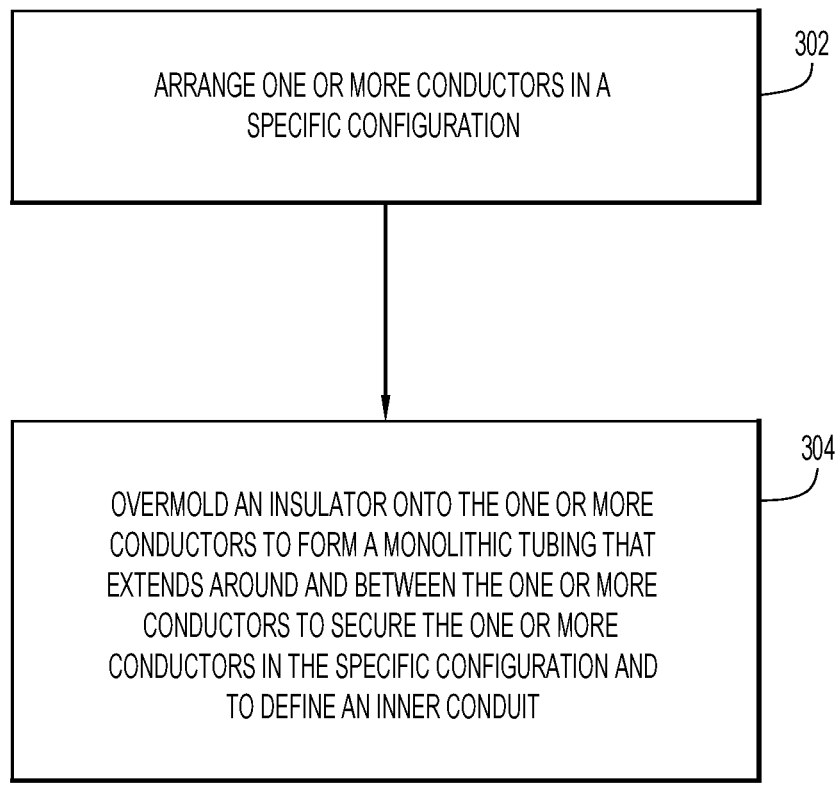
FIG. 10 is a high-level flow chart illustrating a method for forming a cable hose with embedded elements in accordance with an example embodiment of the present disclosure.

FIG. 10 depicts a high-level flow chart illustrating a method 300 for forming a cable hose with embedded elements in accordance with an example embodiment of the present disclosure. Initially, at 302, one or more of conductors are arranged in a specific configuration. For example, a set of uninsulated or insulated conductors can be aligned in a straight, parallel configuration around a circumference of a cross-sectional area (like in FIGS. 3A and 3B or FIGS. 5A, 5B, and 8A-C, respectively). Alternatively, two sets of straight, uninsulated conductors can be aligned in a straight, parallel configuration around a single circumference or two circumferences (like in FIGS. 4A and 4B or FIGS. 6A and 6B, respectively). Still further, a set of conductors can be aligned in a helical configuration that encircles a particular circumference (like in FIGS. 7A-C).

At 304, an insulator is overmolded onto the one or more conductors to form a monolithic tubing that extends around and between the one or more conductors to secure the one or more conductors in the specific configuration and to define an inner conduit. As has been described herein, the inner conduit is configured to allow a gas to flow from a first end of the cable hose to a second end of the cable hose. Meanwhile, the monolithic tubing provides a closed path from the first end to the second end for the specific configuration of the one or more conductors. In at least some embodiments, the overmolding may also form an internal element disposed within the inner conduit and/or ridges on an inner wall of the monolithic tubing that defines the inner conduit. These features may, among other advantages, introduce turbulence into the gas flowing through thinner conduit that reduces boundary layers in the flow.

To summarize, in one form a cable hose suitable for welding or cutting systems is presented herein, the cable hose comprising: one or more conductors; and monolithic tubing that extends around and between the one or more conductors to define: (1) one or more discrete passageways for the one or more conductors that provide a closed path from a first end of the cable hose to a second end of the cable hose for the one or more conductors; and (2) an inner conduit configured to allow a gas to flow from the first end to the second end.

In another form, a welding or cutting system is presented herein, the system comprising: a power source; a torch assembly; and a cable hose extending between the power source and the torch assembly, the cable hose including monolithic tubing that extends around and between the one or more conductors to define: (1) one or more discrete passageways for the one or more conductors that provide a closed path for the conductors to extend between the power source and the torch assembly; and (2) an inner conduit configured to allow a gas to flow from the power source to the torch assembly.

In yet another form, a method of forming a cable hose is presented herein, the method comprising: arranging one or more conductors in a specific configuration; and overmolding an insulator onto the one or more conductors to form a monolithic tubing that extends around and between the one or more conductors to secure the one or more conductors in the specific configuration and to define an inner conduit configured to allow a gas to flow from a first end of the cable hose to a second end of the cable hose, and wherein the monolithic tubing provides a closed path from the first end to the second end for the specific configuration of the one or more conductors.

Although the techniques are illustrated and described herein as embodied in one or more specific examples, the specific details of the examples are not intended to limit the scope of the techniques presented herein, since various modifications and structural changes may be made within the scope and range of the invention. For example, a cable hose formed in accordance with the techniques presented herein may include any number of embedded conductors, arranged in any desirable configuration within tubing of any shape.

In addition, various features from one of the examples discussed herein may be incorporated into any other examples. For example, the ridges 214 and internal elements 230 depicted in FIGS. 7A-C, 8A-C, 9A, and 9B may be included in any of the embodiments depicted in any of the other Figures, the conductor configurations shown in any of the Figures (e.g., the two-ring configuration shown in FIGS. 6A and 6B, the single circle alternating pattern shown in FIGS. 4A and 4B, or the helical arrangement shown in FIGS. 7A-7C) may be incorporated into embodiments with or without covers 218, embodiments with or without ridges 214, embodiments of any thickness, inner diameter, outer diameter, etc. As one specific example, any of the embodiments shown in at least FIGS. 3A, 3B, 4A, 4B, 5A, 5B, 6A, and 6B might be modified to include helical conductors 250, ridges 214, and/or internal element 230. Accordingly, the appended claims should be construed broadly and in a manner consistent with the scope of the disclosure.

We claim:

1. A cable hose suitable for welding or cutting systems, comprising:
   one or more conductors;
   monolithic tubing that extends around and between the one or more conductors to define:
   (1) one or more discrete passageways for the one or more conductors that provide a closed path from a first end of the cable hose to a second end of the cable hose for the one or more conductors; and
   (2) an inner conduit configured to allow a gas to flow from the first end to the second end; and a helical internal component extending along the monolithic tubing within the inner conduit, wherein the helical internal component has at least two segments extending radially from a central portion and collectively spanning a cross-sectional area of the inner conduit, the helical internal component being configured to introduce turbulence into the flow of the gas flowing through the inner conduit and divide the inner conduit into two or more sub-conduits.

2. The cable hose of claim 1, wherein the one or more conductors comprise a plurality of conductors and the monolithic tubing is formed around and between the plurality of conductors by molding an insulator over the plurality of conductors.

3. The cable hose of claim 1, wherein the one or more conductors comprise electrical conductors and the closed path is an insulated path that prevents electrical current introduced into the cable hose at the first end or the second end from exiting the cable hose radially.

4. The cable hose of claim 3, wherein the one or more electrical conductors comprise uninsulated electrical conductors.

5. The cable hose of claim 1, wherein the one or more conductors comprise optical conductors and the closed path prevents optical signals introduced into the cable hose at the first end or the second end from exiting the cable hose radially.

6. The cable hose of claim 1, wherein the one or more conductors include a first set of conductors and a second set of conductors.

7. The cable hose of claim 6, wherein the first set of conductors is arranged around a first circumference and the second set of conductors is arranged around a second circumference, the first and second circumferences each being disposed within the monolithic tubing.

8. The cable hose of claim 6, wherein the first set of conductors and the second set of conductors are both patterned around a single circumference within the monolithic tubing.

9. The cable hose of claim 1, wherein the one or more conductors are fixed in place within the one or more discrete passageways from the first end to the second end of the cable hose.

10. The cable hose of claim 1, wherein an inner wall of the monolithic tubing defines the inner conduit, an outer wall of the monolithic tubing defines an outer surface of the cable hose, and the one or more conductors are disposed between the inner wall and the outer wall.

11. The cable hose of claim 1, wherein the monolithic tubing defines the helical internal component, and the turbulence introduced by the helical internal component reduces a pressure loss in the flow of the gas through the inner conduit.

12. The cable hose of claim 1, wherein the cable hose is configured to connect a power source for a welding or cutting system to a torch assembly for the welding or cutting system so that the power source can supply the flow of the gas and electrical current to the torch assembly.

13. The cable hose of claim 12, wherein the cable hose also allows signals to travel between the power source and the torch assembly.

14. A welding or cutting system comprising:
   a power source;
   a torch assembly;
   a cable hose extending between the power source and the torch assembly, the cable hose including monolithic tubing that extends around and between one or more conductors to define:
   (1) one or more discrete passageways for the one or more conductors that provide a closed path for the one or more conductors to extend between the power source and the torch assembly; and
   (2) an inner conduit configured to allow a gas to flow from the power source to the torch assembly; and
   a helical internal component extending along the monolithic tubing within the inner conduit, wherein the helical internal component has at least two segments extending radially from a central portion and collectively spanning a cross-sectional area of the inner conduit, and the helical internal component being configured to introduce turbulence into the flow of the gas flowing through the inner conduit and divide the inner conduit into two or more sub-conduits.

15. The system of claim 14, wherein the one or more conductors are uninsulated electrical conductors and the closed path is an insulated path that prevents electrical current from exiting the cable hose radially.

16. A method of forming a cable hose, comprising:
   arranging one or more conductors in a specific configuration; and
   overmolding an insulator onto the one or more conductors to form a monolithic tubing that extends around and between the one or more conductors to secure the one or more conductors in the specific configuration and to define an inner conduit configured to allow a gas to flow from a first end of the cable hose to a second end of the cable hose, the inner conduit having a helical internal component extending through the inner conduit, wherein the helical internal component has at least two segments extending radially from a central portion and collectively spanning a cross-sectional area of the inner conduit, and the helical internal component configured to introduce turbulence into the flow of the gas flowing through the inner conduit and divide the inner conduit into two or more sub-conduits, and wherein the monolithic tubing provides a closed path from the first end to the second end for the specific configuration of the one or more conductors.

17. The method of claim 16, wherein the one or more conductors are uninsulated electrical conductors and the closed path is an insulated path that prevents electrical current from exiting the cable hose radially.

18. The method of claim 16, further comprising forming the helical internal component with the monolithic tubing, or inserting the helical internal component within the inner conduit of the formed monolithic tubing.

\* \* \* \* \*